United States Patent
Butzmann et al.

(10) Patent No.: US 10,290,905 B2
(45) Date of Patent: May 14, 2019

(54) ELECTROCHEMICAL ENERGY ACCUMULATOR AND METHOD FOR SWITCHING CELLS OF AN ELECTROCHEMICAL ENERGY ACCUMULATOR

(71) Applicant: Robert Bosch GmbH, Stuttgart (DE)

(72) Inventors: Stefan Butzmann, Schalksmühle (DE); Philipp Hillenbrand, Neuffen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 15/300,864

(22) PCT Filed: Mar. 16, 2015

(86) PCT No.: PCT/EP2015/055407
§ 371 (c)(1),
(2) Date: Sep. 30, 2016

(87) PCT Pub. No.: WO2015/150060
PCT Pub. Date: Oct. 8, 2015

(65) Prior Publication Data
US 2017/0025712 A1    Jan. 26, 2017

(30) Foreign Application Priority Data
Mar. 31, 2014   (DE) ........................ 10 2014 205 911

(51) Int. Cl.
*H02J 7/00* (2006.01)
*H02J 7/14* (2006.01)
(Continued)

(52) U.S. Cl.
CPC ....... *H01M 10/425* (2013.01); *H01M 10/441* (2013.01); *H02J 7/0016* (2013.01);
(Continued)

(58) Field of Classification Search
USPC ........ 320/112, 113, 114, 115, 116, 132, 134, 320/135, 136, 119
See application file for complete search history.

(56) References Cited

U.S. PATENT DOCUMENTS

2007/0247106 A1* 10/2007 Kawahara ............ B60L 3/0046
320/104
2010/0082198 A1*  4/2010 Arai .................... B60R 16/033
701/31.4
(Continued)

FOREIGN PATENT DOCUMENTS

DE     102011002548      7/2012
DE     102011075376      11/2012
(Continued)

OTHER PUBLICATIONS

International Search Report for Application No. PCT/EP2015/055407 dated May 26, 2015 (English Translation, 2 pages).

*Primary Examiner* — Alexis B Pacheco
(74) *Attorney, Agent, or Firm* — Michael Best & Friedrich LLP

(57) ABSTRACT

The invention relates to an electrochemical energy accumulator and to a method for switching cells of an electrochemical energy accumulator. According to the invention, the following steps are carried out: a first desired value of an output voltage of the energy accumulator is determined, a first probability for switching a first cell is determined, said first probability predefining connection and/or disconnection of the first cell to or from the electromechanical energy accumulator, a first common state of charge threshold value being defined for all cells of the electrochemical energy accumulator in accordance with the first desired value, and the first cell is disconnected independently from the first probability value as long as the charge state lies below the charge state threshold value.

10 Claims, 3 Drawing Sheets

(51) Int. Cl.
*H01M 10/42* (2006.01)
*H01M 10/44* (2006.01)

(52) U.S. Cl.
CPC ....... *H02J 7/0026* (2013.01); *H01M 10/4257* (2013.01); *H01M 2010/4271* (2013.01)

(56) References Cited

U.S. PATENT DOCUMENTS

| | | | | |
|---|---|---|---|---|
| 2010/0246287 | A1* | 9/2010 | Vigoda | G11C 7/1006 365/189.15 |
| 2010/0261048 | A1* | 10/2010 | Kim | H01M 10/44 429/150 |
| 2013/0271068 | A1* | 10/2013 | Komoda | H01M 10/482 320/107 |
| 2014/0035361 | A1* | 2/2014 | Schmidt | B60L 11/1803 307/10.1 |
| 2014/0210380 | A1* | 7/2014 | Butzmann | B60L 3/12 318/139 |

FOREIGN PATENT DOCUMENTS

| | | |
|---|---|---|
| DE | 102011054790 | 4/2013 |
| JP | 07163060 | 6/1995 |
| JP | 2002058169 | 2/2002 |
| JP | 2012150086 | 8/2012 |

\* cited by examiner

ELECTROCHEMICAL ENERGY ACCUMULATOR AND METHOD FOR SWITCHING CELLS OF AN ELECTROCHEMICAL ENERGY ACCUMULATOR

BACKGROUND OF THE INVENTION

The present invention relates to an electrochemical energy accumulator and to a method for switching cells of an electrochemical energy accumulator. The present invention particularly relates to improvements in the actuation of the individual cells for reducing switching losses.

The connection of individual electrochemical storage cells ("cells") of an electrochemical energy accumulator in series or in parallel in order in each case to achieve desired source characteristics is known from the prior art. A series circuit of electrochemical energy accumulators increases the maximum terminal voltage, whereas a parallel circuit increases the maximum terminal current. In order to satisfy unequal states of charge and states of health of the individual cells of the electrochemical energy accumulator, it is proposed in the prior art that the cells are allowed to participate in the energy output and/or the energy intake of the electrochemical energy accumulator on the basis of probability functions. In this context, the prior art also relates to smart cells which comprise an electrochemical cell, two power semiconductors or respectively power transistors in a half-bridge configuration as well as a cell monitoring circuit having an integrated control unit. FIG. 1 shows a circuit diagram of one such smart cell, also referred to as an intrinsically safe battery cell. A cell monitoring circuit 2 as well as an arrangement of power electronic switches is provided in parallel to cell 3. The latter comprises semiconductor switching diodes 4, 7 connected in series as well as diodes 5,6 which are likewise connected in series and are provided in reverse orientation to the semiconductor switching diodes 4, 7. The semiconductor switching diode 4 and the diode 5 thereby form an upper portion of the half-bridge, the semiconductor switching diode 7 and the diode 6 forming a lower portion of the half-bridge. A connection provided between the semiconductor switching diodes 4, 7 and the diodes 5, 6 forms the output of the smart cell 1 jointly with a connection 9 at the common switching point of the cell 3, the cell monitoring circuit 2 and the lower half-bridge 6, 7. During normal operation, the cell 3 is switched on using the upper portion of the half-bridge 4, 5, whereas the lower portion of the half-bridge 6, 7 is used to switch off the cell 3. As soon as the cell reaches an impermissible state (e.g. maximum minus or minimum voltage or respectively maximum temperature or minimum temperature), whereby the safety of the smart cell 1 is impaired, the upper portion of the half-bridge 4, 5 is switched off, while the lower portion 6, 7 is switched on. An alternative (not depicted) to the smart cell 1 depicted in FIG. 1 uses a full-bridge which makes a reversal of the polarity of the electric voltage possible. In order to achieve a predefined value of a terminal voltage $V_{Set\_total}$, it is proposed according to the prior art that a control unit of the electrochemical accumulator allows one or a plurality of smart cells 1 to be connected in series or in parallel to one another while said smart cells are each switched on with a predefined probability $P_{on}$.

FIG. 2 shows a flow diagram to illustrate the generation of the output voltage $V_{actual\_total}$ using a switch-on probability for the smart cell 1. In the flow diagram 10, an actual default value for the voltage $V_{set\_total}$ within a control unit 11 is multiplied by a correction value 12. An additional value is added to the result. The additional value consisting of the difference between the default value $V_{set\_total}$ and an actual terminal voltage value $V_{actual\_total}$, which is multiplied by a second correction factor 14, is added in an adder 13. A switch-on probability $P_{on}$ of a plurality 16 of battery cells is added in the result, which leads to the actual voltage value $V_{actual\_total}$ that can be applied to a load 17.

In FIG. 3, a schematic circuit diagram of a series circuit of intrinsically safe battery cells 21, 22, 23, 2n is depicted. A control unit 24 sets defaults for the cells 21, 22, 23, 2n with regard to a switch-on probability $P_{on}$ and/or a switch-off probability $P_{off}$. The control unit 24 receives the terminal voltage $V_{actual\_total}$ dropping across the load 17 as an input variable. It is an aim of the present invention to carry out the operation, in particular the balancing (cell state balancing) of a generic electrochemical energy accumulator faster and more efficiently.

SUMMARY OF THE INVENTION

The aim mentioned above is met by a two-step process according to the present invention. In a first step, a single probability distribution curve for adapting the voltage of a cell is generated; and in a second step, a deviation of the terminal voltage from the default value is used in order to calculate a correction of the cell voltages on the basis of the charging states of the cells in connection with a mathematical function. To this end, the method according to the invention for switching cells of an electrochemical energy accumulator comprises the following steps: a first desired value of an output voltage of the energy accumulator consisting of a plurality of cells is initially determined. This can, for example, be determined on the basis of an operating state of a connected load. A first probability for switching a first cell of the electrochemical energy accumulator is subsequently determined. The first probability can also be assigned to additional cells or all of the cells of the electrochemical energy accumulator. The operation (switching-on and/or switching off) of the cell is determined on the basis of the first probability. In this case, the first probability is only a minimum requirement for carrying out the method according to the invention. Different probabilities (for example: switch-on probability and switch-off probability) can, of course, be determined and assigned to the first cell. In addition, a first common state of charge threshold value is defined for all cells of the electrochemical energy accumulator in accordance with the first desired value (output voltage). The state of charge threshold value thereby determines a lower limit of a state of charge for the cells of the electrochemical energy accumulator, beneath which the first cell remains switched off independently of the first probability. This does not exclude that the first probability value is assigned to the first cell. Only the application thereof is prevented when the state of charge threshold value is undershot. Above the state of charge threshold value, the first cell can be switched on or respectively off in accordance with the first probability. In this way, it can be prevented that a state of charge balance between the cells of an electrochemical energy accumulator involves many independent probability functions, which in total generate high switching losses and can take up a long period of time.

In addition, the method can comprise determining a second desired value of the output voltage of the energy accumulator which deviates from the first threshold value of the output voltage. This second desired value can, for example, be determined in response to a changed operating state of a load connected to the electrochemical energy accumulator. In response thereto, the first common state of charge threshold value is redefined for all cells of the electrochemical energy accumulator in accordance with the second desired value. In this way, it can be determined that such cells, the state of charge of which lies below the first state of charge threshold value; not however below the second (redefined) state of charge threshold value, also participate in the power balance of the electrochemical energy accumulator when there is, for example, an increased requirement for electrical power. In this way, the output voltage can be adapted independently of a redefinition of the first probability, whereby time losses and signaling costs and effort can be kept to a minimum.

In a preferred manner, a difference between the first and the second desired value can be determined and used for redefining the first common state of charge threshold value. In other words, the first common state of charge threshold value can be redefined on the basis of a predefined mathematical function after the change in the desired output voltage has been determined. This provides a simple option for adapting the first desired value.

In a preferred manner, a difference between the first and the second desired value can be communicated to the cells by the electrochemical energy accumulator (respectively the control unit thereof). In response thereto, the cells individually determine the new charge state threshold value with the aid of a predefined algorithm. The predefined algorithm can, for example, comprise a number of stored values, from which the individual cell selects one lying closest to the difference and loads an associated charge state threshold value. Such an adaptation of the charge state threshold value can be constituted with minimal signaling cost and effort and the least possible computing power requirement within the individual cells (or respectively the cell monitoring circuits thereof).

Alternatively, the new (updated) state of charge threshold value can be communicated to the cells by the electrochemical energy accumulator or respectively by the control unit thereof. In this way, a computation of the state of charge threshold value can be completely omitted within the smart cells.

The first probability value can also be provided to the cells of the energy accumulator or respectively to the control unit thereof. As mentioned above, different probabilities $P_{on}/P_{off}$ can be assigned and used for switch-on processes and switch-off processes. In this way, new voltage desired values can also be implemented which cannot be achieved alone by an adaptation of the state of charge threshold value.

The output voltage of the electrochemical energy accumulator can be defined by the adaptation of a first probability value for a switch-on probability and by adaptation of a second probability value for a switch-off probability. In so doing, the first probability value can be increased in order to increase the desired value and the second probability value can be increased in the case of a reduction in the desired value. This offers more flexibility when adapting a desired value for the output voltage of the electrochemical accumulator.

A second aspect of the present invention relates to an electrochemical energy accumulator comprising cells for storing electrical energy and a processing device. That which was said in connection with the method according to the invention also correspondingly applies to the cells which can be configured as smart cells. The processing device can, for example, be designed as a control unit as said device has likewise been functionally described in connection with the method according to the invention. The electrochemical accumulator is equipped with these elements to carry out the method according to the invention, as it has been described above in detail. The features, feature combinations as well as the advantages ensuing therefrom correspond clearly to those described in connection with the first stated aspect of the invention such that reference is made to the embodiments mentioned above in order to avoid repetition.

BRIEF DESCRIPTION OF THE DRAWINGS

Exemplary embodiments of the invention are described below in detail with reference to the accompanying drawings. In the drawings.

DETAILED DESCRIPTION

Figure 1:
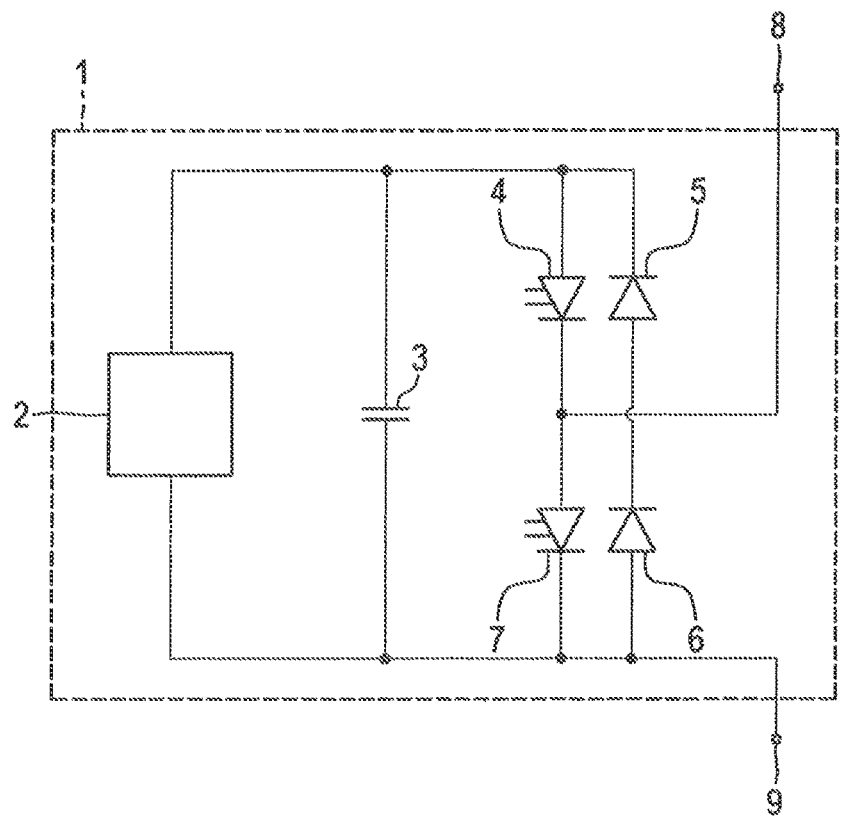
FIG. 1 shows a schematic circuit diagram of a smart cell.
Figure 2:
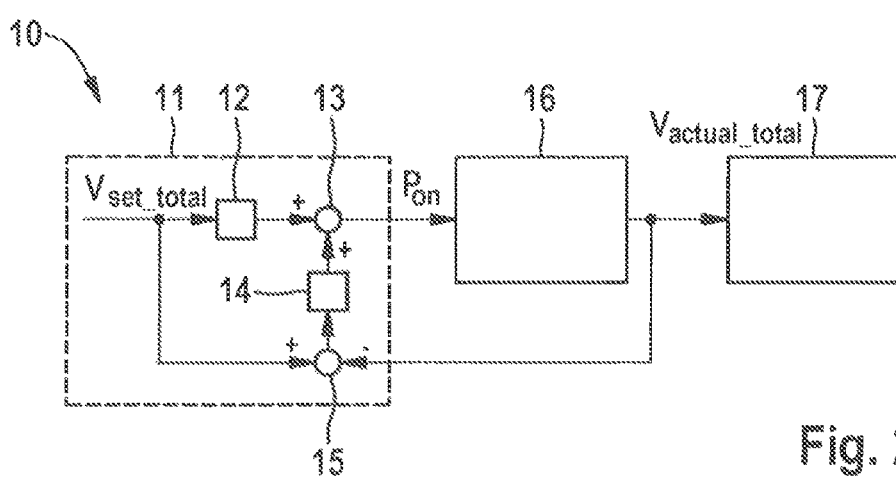
FIG. 2 shows a schematic flow diagram for defining the output voltage of an energy accumulator.
Figure 3:
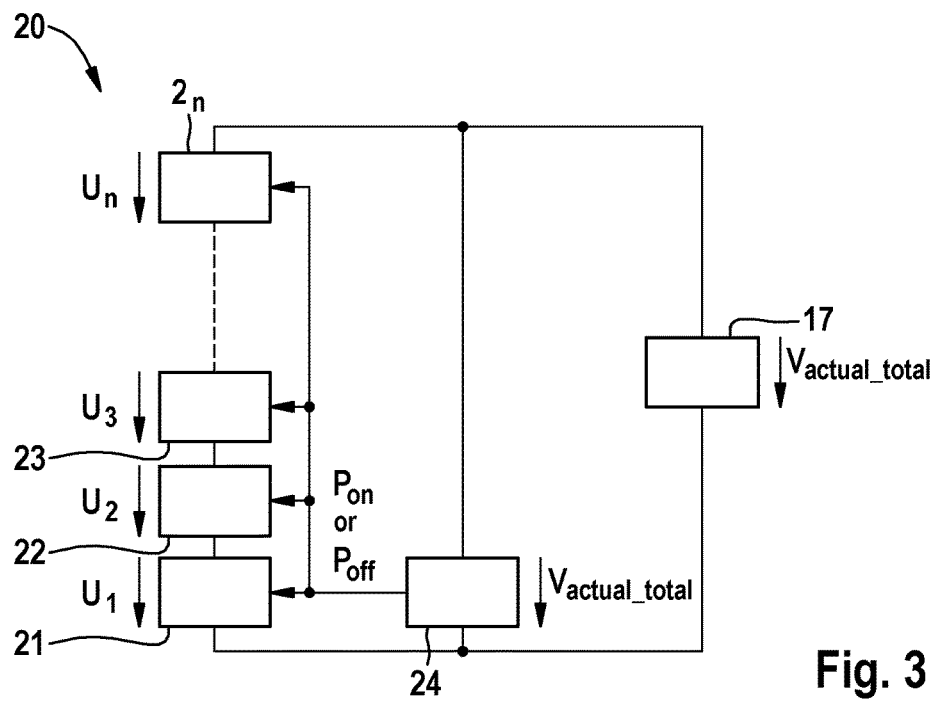
FIG. 3 shows a basic circuit diagram of an intrinsically safe battery cell.
Figure 4:
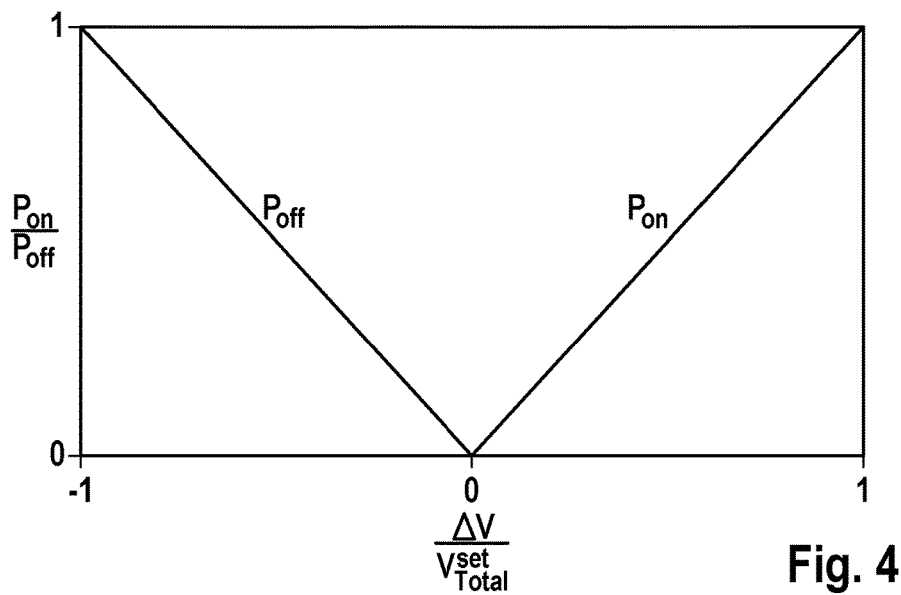
FIG. 4 shows a diagram for defining switch-on and switch-off probabilities as a function of a change in the voltage desired value.

FIG. 4 shows a possible relationship for defining a first probability value $P_{on}$ as well as a second probability value $P_{off}$ in accordance with a standardized change in the output voltage. The change in the output voltage is standardized to the current predefined value for the output voltage. A linear increase in the first probability $P_{on}$ results for positive values, wherein the first probability assumes a value of 0, provided that the standardized change in voltage is likewise 0, and the first probability assumes a value of 1, provided that the standardized change in voltage likewise has a value of 1. A linear relationship for the second probability $P_{off}$ results for negative standardized changes in the output voltage, wherein the second probability $P_{off}$ assumes a value of 1, provided the standardized change in the output voltage assumes a value of −1 and the second probability $P_{off}$ assumes a value of 0, provided that the standardized change likewise has a value of 0.

Figure 5:
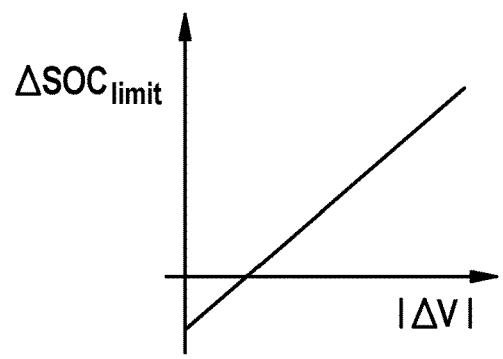
FIG. 5 shows a depiction of an exemplary relationship between a state of charge threshold value and the amount of change in the voltage desired value.

FIG. 5 shows a possible relationship between a change in the state of charge threshold value $\Delta SOC_{limit}$ in accordance with an amount of change in the output voltage. The profile shows a curve which increases linearly and which intersects the abscissa for positive values of the amount of the change in the output voltage. The state of charge threshold value $SOC_{limit}$ can be continually increased for the case of smaller changes in the amount of the output voltage, which only allows stronger cells to participate in the balancing method. In so doing, the stronger cells carry out the switch-on or respectively switch-off steps using the respective probabilities $P_{on}$ and $P_{off}$ and thus contribute exclusively to the active balancing of the cells. The *stronger* cells determine here the SOC level at which the balancing is to be carried out. Weaker cells, which do not satisfy the condition $SOC_{cell} > SOC_{limit}$ and are therefore permanently switched off, do not take part in the active balancing of the cells.

Figure 6:
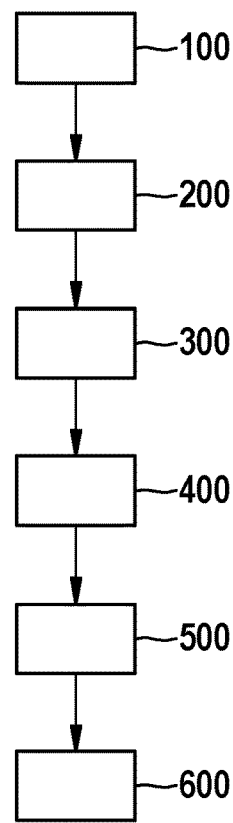
FIG. 6 shows a flow diagram illustrating steps of an exemplary embodiment of a method according to the invention.

FIG. 6 shows a flow diagram illustrating steps of an exemplary embodiment of a method according to the invention. In step 100, a first desired value of an output voltage is determined for an electrochemical energy accumulator. In step 200, a first probability for switching a first cell of the electrochemical energy accumulator is determined, said first probability predefining connection and/or disconnection of the first cell to or from the electrochemical accumulator. In step 300, a first common state of charge threshold value is defined for all cells of the electrochemical energy accumulator in accordance with the first desired value. In step 400, the first cell is switched off independently of the first probability value, provided that the state of charge thereof lies below the state of charge threshold value. In other words, the first cell remains switched-off at least as long as the charge state thereof lies below the charge state threshold value. In step 500, a second desired value of the output voltage of the energy accumulator, which deviates from the first desired value of the output voltage, is subsequently determined (e.g. due to a changed operating state of a load on the electrochemical energy accumulator). Subsequently in step 600, the first common state of charge threshold value is redefined for all cells of the electrochemical energy accumulator in accordance with the first desired value in order to adapt the output voltage.

Even if the inventive aspects and advantageous embodiments have been described in detail using the exemplary embodiments explained in connection with the attached figures in the drawings, modifications to and combinations of features of the depicted exemplary embodiments are possible for the person skilled in the art without departing from the scope of the present invention, the scope of protection of which is defined by the accompanying claims.

The invention claimed is:

1. A method for switching cells (3, 21, 22, 23, 2n) of an electrochemical energy accumulator (1) comprising the following steps:
   determining (100) a first desired value of an output voltage of the energy accumulator (1),
   determining (200) a first probability for switching a first cell (3, 21, 22, 23, 2n), said first probability predefining connection or disconnection of the first cell to or from the electrochemical energy accumulator (1),
   defining (300) a first common state of charge threshold value for all cells (3, 21, 22, 23, 2n) of the electrochemical energy accumulator (1) in accordance with the first desired value and independently of the first probability value,
   disconnecting (400) the first cell (3, 21, 22, 23, 2n) as long as the charge state thereof lies below the charge state threshold value,
   determining (500) a second desired value of the output voltage ($V_{actual\_total}$) of the energy accumulator (1) that deviates from the first threshold value ($V_{set\_total}$) of the output voltage, and
   redefining (600) the first common state of charge threshold value ($SOC_{limit}$) for all cells (3, 21, 22, 23, 2n) of the electrochemical energy accumulator (1) in accordance with the second desired value.

2. The method according to claim 1, wherein a difference ($\Delta V_{set\_total}$) is determined between the first and the second desired value and is used to redefine the first common state of charge threshold value ($SOC_{limit}$).

3. The method according to claim 1, wherein a difference ($\Delta V_{set\_total}$) between the first and the second desired value is communicated to the cells (3, 21, 22, 23, 2n) by the electrochemical energy accumulator (1), and the cells (3, 21, 22, 23, 2n) individually determine the charge state threshold value ($SOC_{limit}$) by means of an algorithm predefined in the cells (3, 21, 22, 23, 2n).

4. The method according to claim 1, wherein the state of charge threshold value ($SOC_{limit}$) is communicated to the cells (3, 21, 22, 23, 2n) by the electrochemical energy accumulator (1).

5. The method according to claim 1, wherein the first probability is a first probability value ($P_{on}$) that is common to all cells (3, 21, 22, 23, 2n) of the electrochemical energy accumulator (1).

6. The method according to claim 5, wherein the probability value ($P_{on}$) is sent from a processing device of the energy accumulator (1) to all the cells (3, 21, 22, 23, 2n).

7. A method for switching cells (3, 21, 22, 23, 2n) of an electrochemical energy accumulator (1) comprising the following steps:
   determining (100) a first desired value of an output voltage of the energy accumulator (1),
   determining (200) a first probability value and a second probability value for switching a first cell (3, 21, 22, 23, 2n), said first probability value and said second probability value predefining connection or disconnection of the first cell to or from the electrochemical energy accumulator (1),
   defining (300) a first common state of charge threshold value for all cells (3, 21, 22, 23, 2n) of the electrochemical energy accumulator (1) in accordance with the first desired value and independently of the first probability value, and
   disconnecting (400) the first cell (3, 21, 22, 23, 2n) as long as the charge state thereof lies below the charge state threshold value,
   wherein the first probability value ($P_{on}$) for a switch-on probability and a corresponding second probability value ($P_{off}$) for a switch-off probability are defined, said first probability value ($P_{on}$) and said second probability value ($P_{off}$) being determined on the basis of a change in the first desired value ($V_{set\_total}$) or in the second desired value.

8. The method according to claim 7, wherein the first probability value ($P_{on}$) is increased when the desired value ($V_{set\_total}$) is increased and the second probability value ($P_{off}$) is increased when the desired value ($V_{set\_total}$) is reduced.

9. The method according to claim 7, wherein the first probability value ($P_{on}$) and the second probability value ($P_{off}$) are sent from a processing device of the energy accumulator (1) to all the cells (3, 21, 22, 23, 2n).

10. The method according to claim 1, wherein the determining of the first probability for switching the first cell is provided from a single probability distribution curve for adapting the voltage of the cell.

\* \* \* \* \*